(12) United States Patent
Setchell et al.

(10) Patent No.: US 10,333,929 B2
(45) Date of Patent: Jun. 25, 2019

(54) ACCESS CONTROL FOR INTERNET OF THINGS DEVICES

(71) Applicant: GOOGLE INC., Mountain View, CA (US)

(72) Inventors: William Setchell, Sunnyvale, CA (US); Nitsan Shai, Palo Alto, CA (US); Timothy Raymond Zwiebel, Mountain View, CA (US); Ye Yuan, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 179 days.

(21) Appl. No.: 15/232,778

(22) Filed: Aug. 9, 2016

(65) Prior Publication Data

US 2017/0041316 A1 Feb. 9, 2017

Related U.S. Application Data

(60) Provisional application No. 62/202,879, filed on Aug. 9, 2015.

(51) Int. Cl.
*H04L 29/06* (2006.01)
*H04W 12/08* (2009.01)
(Continued)

(52) U.S. Cl.
CPC ........ *H04L 63/0876* (2013.01); *H04L 63/101* (2013.01); *H04L 63/108* (2013.01);
(Continued)

(58) Field of Classification Search
CPC . H04L 63/0876; H04L 63/101; H04L 63/108; H04L 63/166; H04L 63/0528;
(Continued)

(56) References Cited

U.S. PATENT DOCUMENTS

| | | | |
|---|---|---|---|
| 9,602,508 B1* | 3/2017 | Mahaffey | H04L 63/0869 |
| 2012/0083270 A1* | 4/2012 | Robbins | H04W 4/14 455/435.1 |

(Continued)

FOREIGN PATENT DOCUMENTS

WO 2017/027487 A1 2/2017

OTHER PUBLICATIONS

Zanglein, "International Search Report and Written Opinion issued in International Application No. PCT/US2016/046090", dated Dec. 2, 2016, 13 pages.

(Continued)

*Primary Examiner* — Sarah Su
(74) *Attorney, Agent, or Firm* — Johnson, Marcou & Isaacs, LLC (57) ABSTRACT

Requesting, by a requesting device, from an Internet of Things (IoT) device, an IoT device identifier over a communication link between the devices. Requesting, by the requesting device from an authorization device over a communication network including at least one TCP/IP link, authorization to command the IoT device to perform an action. Determining, by the authorization device, an authorization of the requesting device to command the identified IoT device to perform the requested action based on the IoT device identifier, the requesting device identifier, and the command. For a requesting device determined authorized, transmitting an encrypted authorization to the requesting device over the communication network. Relaying, by the requesting device to the IoT device via the first communication link, the authorization. Decrypting, by the IoT device, the authorization and performing the action specified therein.

20 Claims, 4 Drawing Sheets

(51) Int. Cl.
*H04L 29/08* (2006.01)
*H04W 12/06* (2009.01)
*H04W 4/70* (2018.01)
*H04W 4/80* (2018.01)

(52) U.S. Cl.
CPC ............ *H04L 63/166* (2013.01); *H04L 67/12* (2013.01); *H04L 67/125* (2013.01); *H04W 4/70* (2018.02); *H04W 4/80* (2018.02); *H04W 12/06* (2013.01); *H04W 12/08* (2013.01); *H04L 63/0428* (2013.01); *H04L 63/18* (2013.01)

(58) Field of Classification Search
CPC ..... H04L 67/12; H04L 63/0428; H04L 63/18; H04L 67/125; H04W 4/70; H04W 4/80; H04W 12/06; H04W 12/08
See application file for complete search history.

(56) References Cited

U.S. PATENT DOCUMENTS

| | | | |
|---|---|---|---|
| 2013/0135115 A1 | 5/2013 | Johnson et al. | |
| 2014/0032413 A1 | 1/2014 | Low et al. | |
| 2014/0324973 A1 | 10/2014 | Goel et al. | |
| 2015/0007273 A1 | 1/2015 | Lin | |
| 2015/0249672 A1* | 9/2015 | Burns | H04L 12/66 726/4 |
| 2015/0347114 A1* | 12/2015 | Yoon | G06F 8/61 235/375 |
| 2016/0112433 A1* | 4/2016 | Chung | H04W 4/70 726/4 |
| 2016/0285628 A1* | 9/2016 | Carrer | H04L 9/3228 |
| 2017/0142090 A1* | 5/2017 | Mahaffey | H04L 63/083 |
| 2017/0201385 A1* | 7/2017 | Kravitz | H04L 9/3268 |
| 2017/0228953 A1* | 8/2017 | Lupovici | G07C 9/00309 |
| 2018/0338242 A1* | 11/2018 | Li | H04W 12/06 |
| 2019/0020648 A1* | 1/2019 | Haque | H04L 63/0823 |

OTHER PUBLICATIONS

Nickitas-Etienne, "International Preliminary Report on Patentability issued in International Application No. PCT/US2016/046090", dated Feb. 22, 2018, 10 pages.

Bae, "European Office Action issued in European Application No. 16760591.4", dated Mar. 4, 2019, 4 pages.

* cited by examiner

A requesting device first requests from an IoT device, and receives from the IoT device, an IoT device identifier of the IoT device over a non-TCP/IP communication link between the requesting device and the IoT device
310

↓

The requesting device second requests, from an authorization device over a communication network including at least one TCP/IP communication link, an authorization to command the identified IoT device to perform an action
320

↓

The authorization device receives the second request from the requesting device, determines that the requesting device is authorized to command the identified IoT device to perform the action; for a requesting device so authorized, the authorization device transmits an encrypted authorization to command the IoT to perform the action to the requesting device over the communication network including at least one TCP/IP communication link
330

↓

The requesting device receives the encrypted authorization and relays the encrypted authorization to the IoT device
340

↓

The IoT device receives the encrypted authorization from the requesting device, decrypts the received authorization, and performs the action specified in the authorization
350

ACCESS CONTROL FOR INTERNET OF THINGS DEVICES

CROSS REFERENCE TO RELATED APPLICATIONS

This application claims the benefit of U.S. Provisional Application No. 62/202,879, filed Aug. 9, 2015, and entitled "Access Control for Internet of Things Devices," the entire contents of the above-identified priority application are hereby fully incorporated herein by reference.

TECHNICAL FIELD

The technology disclosed herein relates to Internet of Things (IoT) devices. Example embodiments relate to controlling access to IoT devices indirectly or unreliably connected to the Internet.

BACKGROUND

The "Internet of Things" typically refers to the connection of "things" (hereinafter "IoT devices"), such as sensors, household appliances, security devices, utility meters, and even mundane consumer products (other than traditional end user computing devices, for example, computers, tablets, and smartphones) to the Internet. Such connection is not limited to IoT devices that implement the Internet protocol suite, commonly referred to as Transmission Control Protocol (TCP)/Internet Protocol (IP), but also includes IoT devices indirectly connected to the Internet via an IoT gateway. An IoT device indirectly connected to the Internet through an IoT gateway can implement a communications protocol suite, such as the protocols used in Bluetooth® wireless personal area network (PAN) technology, between the IoT device and the IoT gateway. Such an IoT device may have only an unreliable connection, if any, (whether direct or indirect) to the Internet.

SUMMARY

Methods, computer program products, and system to control access to IoT devices are disclosed herein. In some embodiment, a requesting device first requests, from an IoT device, an IoT device identifier of the IoT device over a first communication link between the requesting device and the IoT device. The requesting device receives, from the IoT device, the requested IoT device identifier. The requesting device second requests, from an authorization device over a communication network including at least one Transmission Control Protocol/Internet Protocol (TCP/IP) communication link, authorization to command the identified IoT device to perform an action. The authorization device receives the second request, and determines, in response to receiving the second request, an authorization of the requesting device to command the identified IoT device to perform the requested action. For a requesting device determined, the authorization device, authorized to command the identified IoT device to perform the requested action, transmits an encrypted authorization for the requesting device to command the IoT device to perform the action, to the requesting device over the communication network. The requesting device receives the transmitted encrypted authorization via the communication network. The requesting device then relays, to the IoT device via the first communication link, the received transmitted encrypted authorization. The IoT device receives the encrypted authorization from the requesting device via the first communication link, decrypts the received authorization, and performs the action specified in the authorization.

DETAILED DESCRIPTION OF EXAMPLE EMBODIMENTS

Overview

IoT devices often carry sensitive information. For example, a heartbeat sensor should only share heartbeat data with the user's device or with authorized medical equipment. IoT devices can also perform actions that only authorized users or other authorized devices should be able to trigger; for example, unlocking the door to a garage or a house. Before transmitting sensitive information or initiating a privileged action, the IoT device should identify, authenticate, and check access control lists (ACLs) for the entity requesting the information or the action. The IoT device also should address the risk of eavesdroppers intercepting the data or performing replay attacks.

Since some IoT devices are not directly or continuously connected to the Internet, traditional approaches for identification and authentication to control access to such IoT devices will not work as well as those approaches work for directly/reliably connected devices. In particular, remotely revocable access control, such as through use of an ACL, is a challenge with traditional approaches.

Consider, as an example, a group of smart water meters in a non-TCP/IP mesh network with intermittent indirect Internet access through a neighborhood Internet gateway. Given the intermittent indirect Internet access, the water company cannot readily edit an ACL on each IoT device. A local agent, who may not be identifiable to a particular IoT device, may need to interact with the IoT device—for example, to collect water usage data, or to program, install, or calibrate the device on behalf of the device owner.

Embodiments herein provide computer-implemented techniques for controlling access to an IoT device. In particular, when a requesting device requests access (for example, to extract data from the IoT device, or command the IoT device) over a non-TCP/IP communications link, the IoT device responds by sending an IoT device token over the non-TCP/IP communications link. The requesting device passes the IoT device token, along with a token of the requesting device, to an authorization device, such as an access control server, over a first communications network, for example, an Internet connection. The access control server uses the requesting device's token and the IoT device's token to determine, for example, through use of an access control list (ACL) on the access control server, if the requesting device should be granted access the IoT device.

If so, then the access is granted. If not, then access is not granted. A requesting device described herein may be any kind of network device that is capable of communicating with an IoT device via a communication network.

By using and relying on the methods and systems described herein, embodiments of the present technology leverage the connectivity of the requesting device to allow simpler IoT devices. Simpler IoT devices enabled by the present technology do not have to establish and update an independent ACL and do not have to maintain a reliable or direct network connection with the access control server over the Internet. Thus, the IoT devices enabled by the present technology require less processing power and consume less transmission bandwidth over the non-TCP/IP communications link. As such, the systems and methods described herein may be employed to reduce the cost of such devices and to increase the ability of the overall system to respond to change. For example, changes to the ACL of a given device do not require access to the device itself. In addition, such an approach makes it more difficult for an unauthorized entity to compromise the IoT device; in part, because the IoT device does not control which other devices access it. Thus, the methods and systems described herein possess the potential to provide enhanced network security.

Turning now to the drawings, in which like numerals represent like (but not necessarily identical) elements throughout the figures, example embodiments are described in detail. In certain example embodiments, a user associated with a device must install an application and/or make a feature selection to obtain the benefits of the techniques described herein. Throughout the discussion of example embodiments, it should be understood that the terms "data" and "information" are used interchangeably herein to refer to text, images, audio, video, or any other form of information that can exist in a computer-based environment.

Example System Architectures

Figure 1:
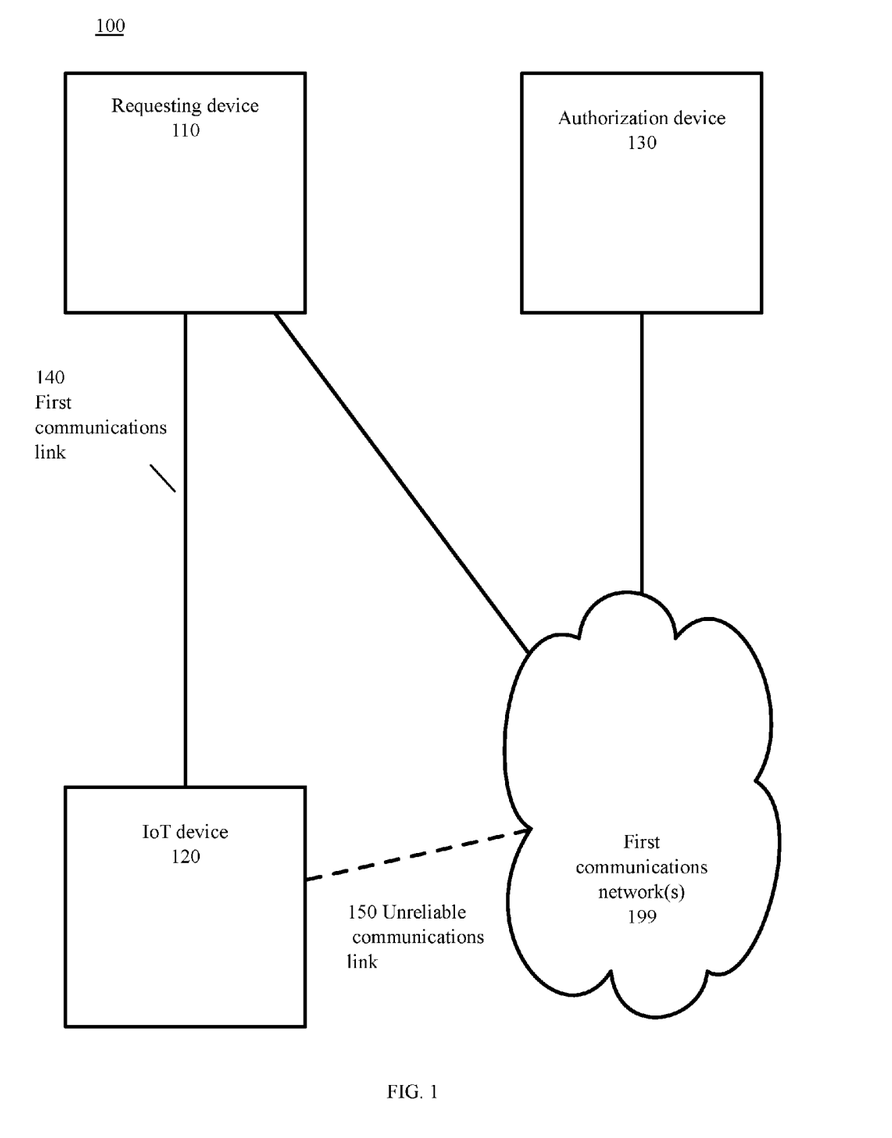
FIG. 1 is a block diagram depicting a communications and processing architecture for controlling access to IoT devices in accordance with certain example embodiments.

FIG. 1 is a block diagram depicting a communications and processing architecture 100 for controlling access to IoT devices in accordance with certain example embodiments. As depicted in FIG. 1, the architecture 100 includes devices 110, 120, and 130 that can be configured to communicate with one another via one or more first network(s) 199. The direct communications link 150 between IoT device 120 and the one or more first network(s) 199 can be characterized as one or more of optional, unreliable, intermittent, or even non-existent. In certain example embodiments, a user associated with a device must install an application and/or make a feature selection to obtain the benefits of the techniques described herein.

Each device 110 and 130 (and in some instances 120) includes a device having a communication module capable of transmitting and receiving data over the first communications network(s) 199. For example, each network device 110 and 130 can include a server, desktop computer, laptop computer, tablet computer, a television with one or more processors embedded therein and/or coupled thereto, smart phone, handheld computer, personal digital assistant ("PDA"), or any other wired or wireless, processor-driven device. Each device 120 can be an IoT device. In the example embodiment depicted in FIG. 1, an IoT device owner, or an agent of the IoT device owner, can operate devices 110, 120, and 130. In other example embodiments, while the requesting device 110 and the IoT device 120 can be owned and operated by the same person, the authorization device 130 can be a server operated by a second party.

The first communications network(s) 199 include wired or wireless telecommunication systems or devices by which network devices (including devices 110 and 130, and in some instances 120) can exchange data. For example, the first communications network(s) 199 can include a local area network ("LAN"), a wide area network ("WAN"), an intranet, an Internet, storage area network (SAN), personal area network (PAN), a metropolitan area network (MAN), a wireless local area network (WLAN), a virtual private network (VPN), a cellular or other mobile communication network, a BLUETOOTH® wireless technology connection, a near field communication (NFC) connection, or any combination thereof or any other appropriate architecture or system that facilitates the communication of signals, data, and/or messages.

It will be appreciated that the network connections shown are example and other means of establishing a communications link between the computers and devices can be used. Additionally, those having ordinary skill in the art and having the benefit of the present disclosure will appreciate that devices 110 and 130 illustrated in FIG. 1 can have any of several other suitable computer system configurations. For example, a requesting device 110 can be embodied as a mobile phone or handheld computer, and may not include all the components described above.

Figure 4:
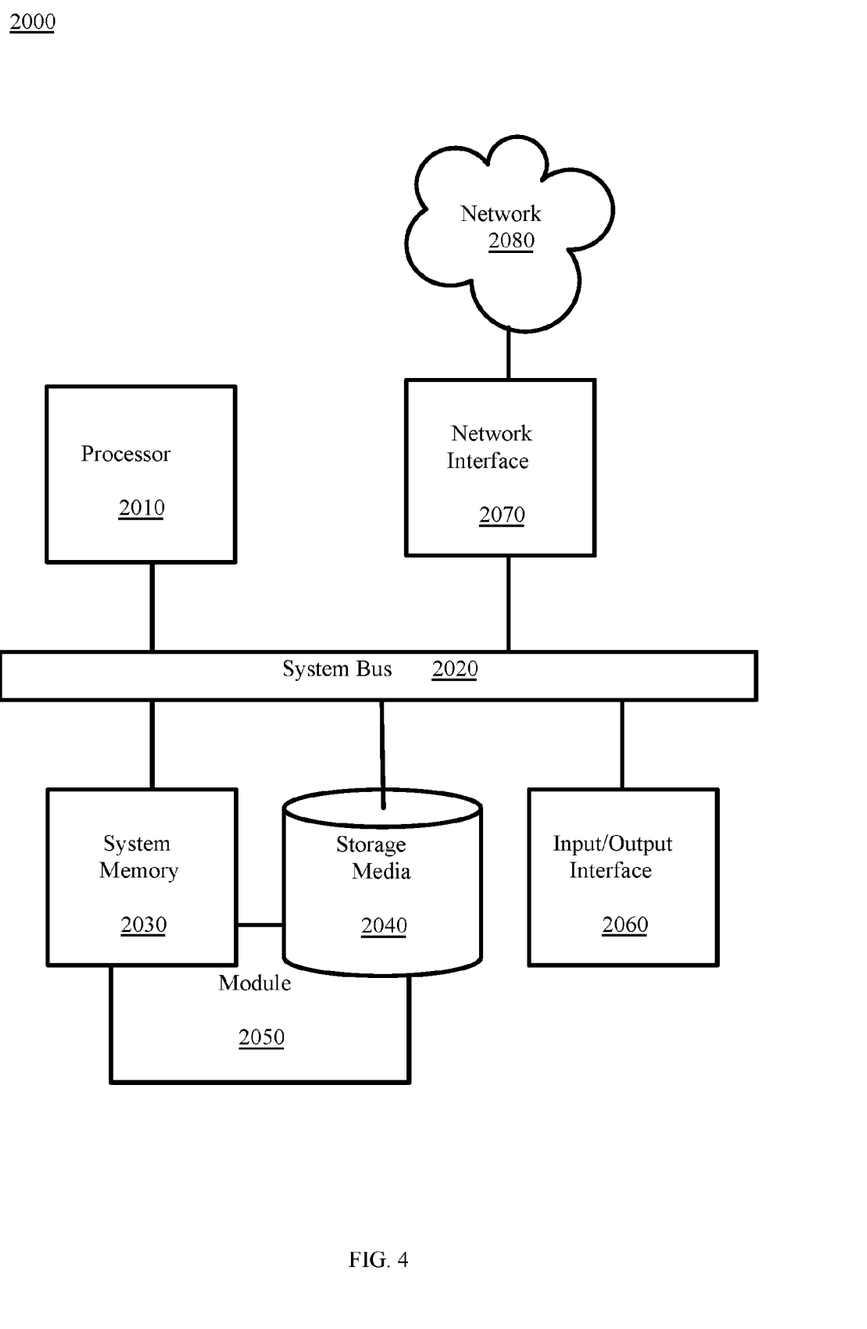
FIG. 4 is a block diagram depicting a computing machine and a module, in accordance with certain example embodiments.

In example embodiments, the network computing devices and any other computing machines associated with the technology presented herein may be any type of computing machine such as, but not limited to, those discussed in more detail with respect to FIG. 4. Furthermore, any functions, applications, or components associated with any of these computing machines, such as those described herein or any others (for example, scripts, web content, software, firmware, hardware, or modules) associated with the technology presented herein, may by any of the components discussed in more detail with respect to FIG. 4. The computing machines discussed herein may communicate with one another, as well as with other computing machines or communication systems over one or more networks, such as first communications network(s) 199. The first communications network(s) 199 may include any type of data or communications network, including any of the network technology discussed with respect to FIG. 4.

Example Processes

Figure 2:
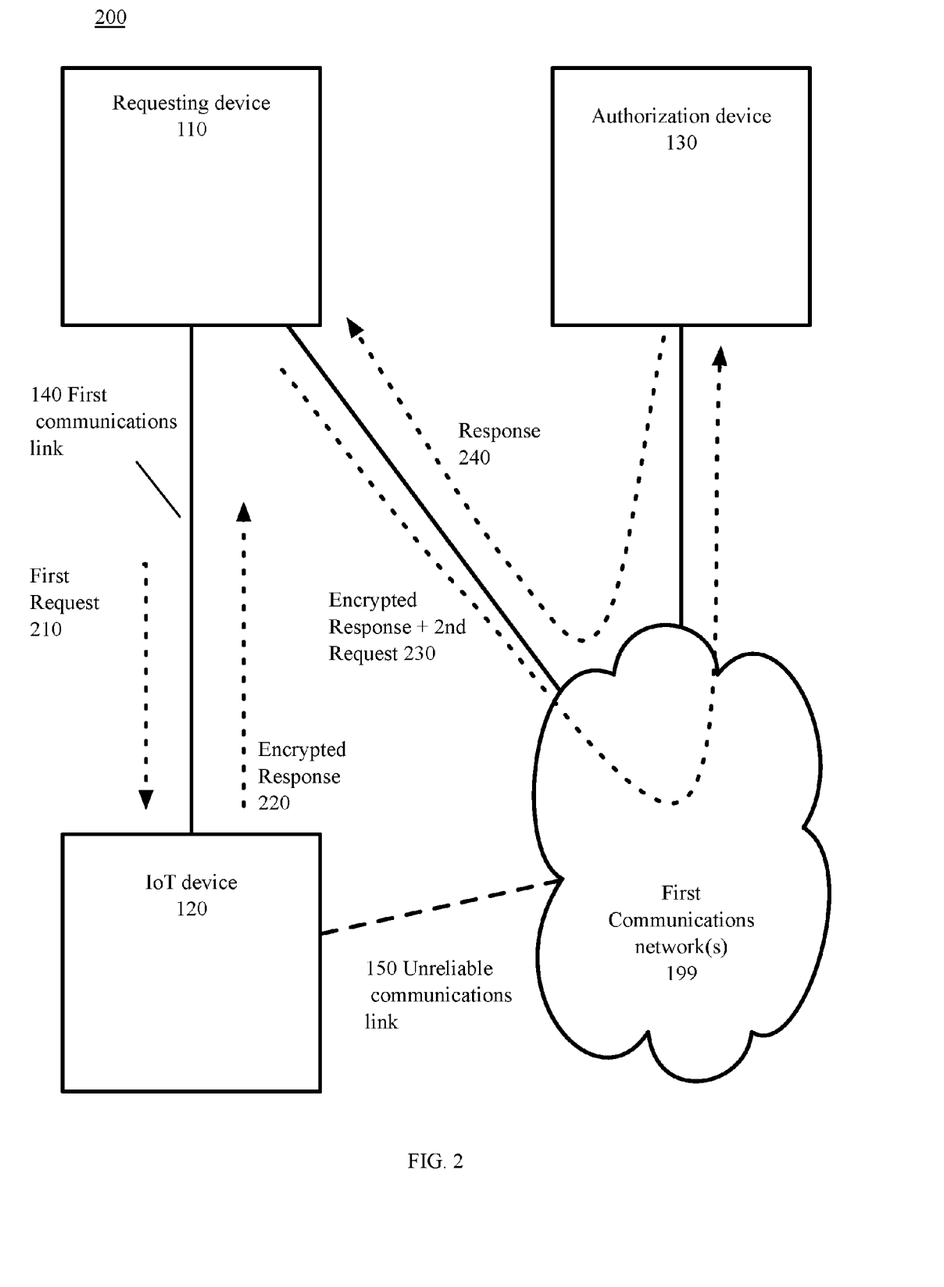
FIG. 2 is a diagram depicting generalized data flows, in the communications and processing architecture of FIG. 1, for controlling access to IoT devices 120, in accordance with certain example embodiments.
Figure 3:
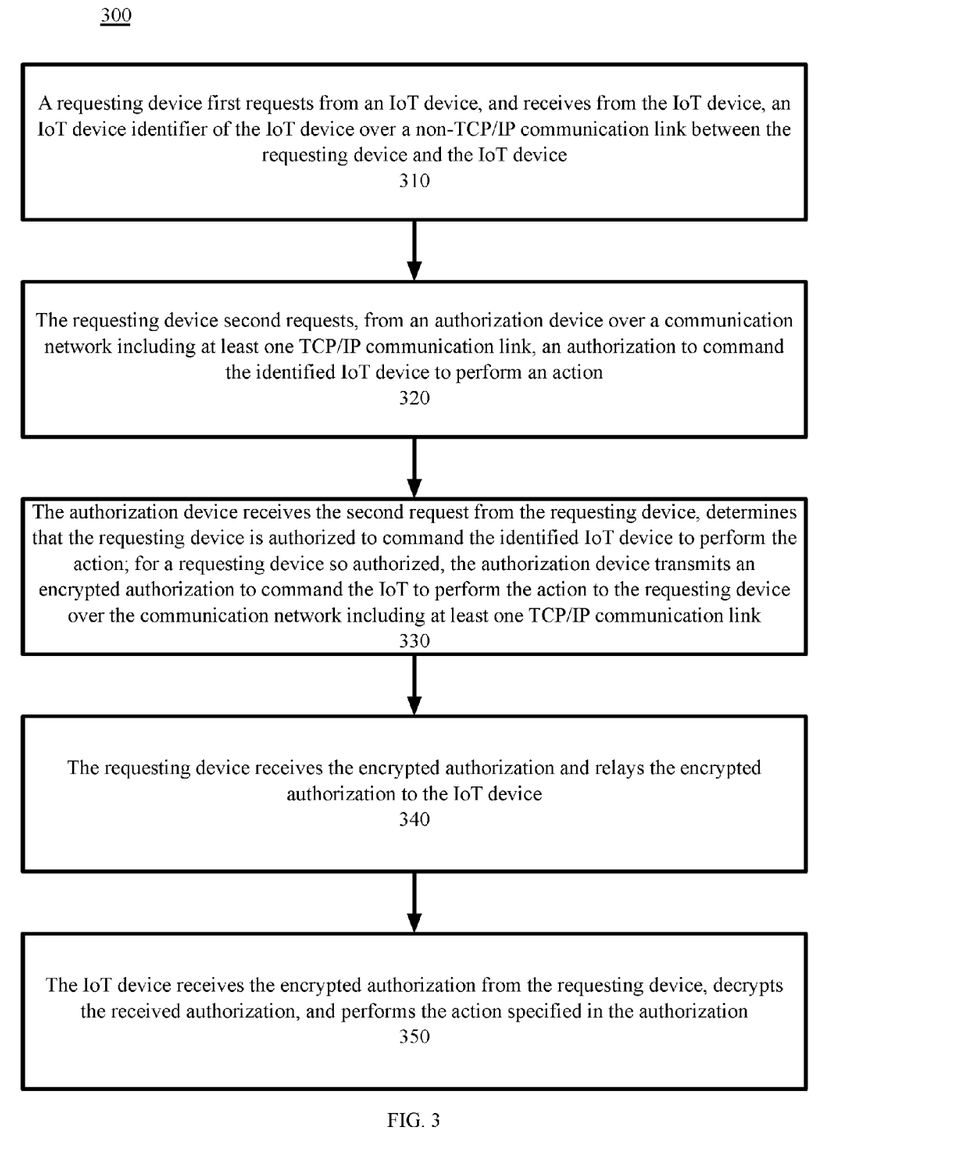
FIG. 3 is a block flow diagram depicting processes for controlling access to IoT devices, in accordance with certain example embodiments.

The example methods illustrated in FIGS. 2-3 are described hereinafter with respect to the components of the example operating architecture 100. The example methods of FIGS. 2-3 may also be performed with other systems and in other environments. The operations described with respect to any of FIGS. 2-3 can be implemented as executable code stored on a computer or machine-readable non-transitory tangible storage medium (e.g., floppy disk, hard disk, ROM, EEPROM, nonvolatile RAM, CD-ROM, etc.). The operations are completed based on execution of the code by a processor circuit implemented using one or more integrated circuits. The operations described herein also can be implemented as executable logic that is encoded in one or more non-transitory tangible media for execution (e.g., programmable logic arrays or devices, field programmable gate arrays, programmable array logic, application specific integrated circuits, etc.).

Consider, as context for the technology described herein, a hands-free payment technology. In embodiments of a hands free payment system, a merchant registers with a payment processing system. A user establishes an account with the payment processing system and transmits an image of himself to the payment processing system to establish a facial template associated with the user account. A user signs into the payment application via the user computing device and enters the merchant system location.

The user computing device receives a merchant beacon device identifier from a merchant beacon device, implemented as an IoT device 120 of the present technology, and transmits the identifier to the payment processing system. The payment processing system transmits facial templates to a merchant camera device (which can also be an IoT device 120) corresponding to users whose user computing devices are in network range of the merchant beacon IoT device 120 and who are signed in to the payment application. The merchant camera device captures a facial image of the user and identifies the user by comparing the captured facial image against the received facial templates. A merchant point of sale device operator selects an account of the user for use in a transaction from one or more displayed accounts of the user. The merchant point of sale device transmits transaction details to the payment processing system, which generates a transaction authorization request to transmit to an issuer system associated with the user account selected for use in the transaction. The payment processing system receives an approval of the transaction authorization request and transmits a receipt to the merchant point of sale device.

FIG. 2 is a diagram depicting generalized data flows 200, in the communications and processing architecture of FIG. 1, for controlling access to IoT devices 120, in accordance with certain example embodiments. In a continuing example embodiment, an installer or maintainer (hereinafter "installer") may use the present technology to interact with a merchant beacon 120. The installer may use the present technology to send configuration commands from a Bluetooth-enabled tablet computer 110 running a merchant beacon interface application to a merchant beacon 120 over a Bluetooth communications link 140. The installer also may request sensitive data (such as security camera footage) from an merchant beacon/IoT device 120. The personnel who are authorized to configure a merchant beacon 120 may change. Embodiments of the present technology can be used to permit/revoke an installer's permissions.

An application on the requesting device 110 can send a request for access to the IoT device 120 over the first communications link 140—Data Flow 210. In the continuing example, the installer initiates a request in an application on a Bluetooth-enabled tablet computer 110 to retrieve current configuration data from a merchant beacon 120. In some such embodiments, the Bluetooth-enabled tablet computer 110 sends a JavaScript Object Notation (JSON)-formatted request to the merchant beacon 120 over the Bluetooth communication link 140.

The IoT device 120 receives the request, and responds to the requesting device 110 with the requested information in an encrypted form unreadable by the requesting device 110, and including an identifier or token of the IoT device 120—Data Flow 220. In the continuing example, the merchant beacon 120 receives the request, and responds to the Bluetooth-enabled tablet computer 110 with an encrypted version of the beacon's 120 current configuration information (including the IoT device's identifier), along with an initialization vector (IV), using the Bluetooth link 140 between the merchant beacon 120 and the tablet computer 110. The tablet computer 110 does not possess a key to decrypt the encrypted configuration information; however, the authorization device 130 does. In some embodiments, the encryption can be based on the Advanced Encryption Standard (AES); though encryption based on any other shared secret encryption standard can be used. In some embodiments, two sets of public/private key pairs can be used instead of shared secret encryption.

The requesting device 110 forwards a request for processing, the encrypted version of the IoT device 120 information, and the IV to the authorization device 130 via the first communications network(s) 199—Data Flow 230. In the continuing example, the tablet computer 110 forwards its request for decryption of the configuration information (including its own identifier), the beacon's 120 encrypted configuration information (including the beacon identifier), and the IV to an in-store server 130 acting as the authorization device 130 over a TCP/IP communications network (such as the store's Wi-Fi network) 199. Any other server in communication with the Bluetooth-enabled tablet computer 110 over the Internet 199 can act as the authorization device 130. The request for processing can be in the form of a remote procedure call (RPC) or other suitable format.

The authorization device 130, after receiving the request for processing the encrypted version of the IoT device 120 information and the IV from the requesting device 110, verifies the identity of the requesting device 110 and authorization of the user/device to perform the requested action, for example, using information contained in the request. In the continuing example, the in-store server 130 can use the requesting device's identifier in the request sent from the tablet computer 110, and the token from the IoT beacon 120 to determine that one or both of the tablet computer 110 and the user thereof is authorized to receive data from the IoT beacon 120. For example, the in-store server 130 can confirm that both the tablet computer 110 identifier and the user thereof are listed in an ACL for the identified beacon 120.

The authorization device 130 can then send the IoT device 120 information to the requesting device 110 in a form that the requesting device can read—Data Flow 240. In the continuing example, the in-store server 130 can send the beacon's 120 current configuration information to the tablet computer 110.

In some embodiments, including an embodiment described below, the response form the authorization device 130 to the requesting device 110 remains encoded in a way that the requesting device 110 cannot read, but that the IoT device 120 can read, as an example, using an encryption scheme shared between the server 130 and the beacon 120 but not shared with the requesting device 110.

FIG. 3 is a block flow diagram 300 depicting processes for controlling access to IoT devices, in accordance with certain example embodiments. As a further example, consider an IoT device 120 controlling a garage door based on messages from a Bluetooth-enabled and 4th generation (4G) Long Term Evolution (LTE)-enabled garage door remote acting as a requesting device 110, and a server, visible to the garage door remote on the Internet via the 4G LTE link 199, acting as the authorization device 130.

A requesting device 110 first requests from an IoT device 120, and receives from the IoT device 120, an IoT device identifier of the IoT device 120 over a non-TCP/IP communication link 140 between the requesting device 110 and the IoT device 120—Block 310. In the further example, the Bluetooth-enabled and 4G LTE-enabled garage door remote 110 requests, and receives, from garage door IoT device 120, the IoT device identifier of the garage door IoT device 120 over a Bluetooth communications link 140 between the garage door remote 110 and the garage door IoT device 120. In some embodiments, the garage door remote 110 is a smartphone.

The requesting device 110 second requests, from an authorization device 130 over a communication network 199 including at least one TCP/IP communication link, authorization to command the identified IoT device 130 to perform an action—Block 320. In the further example, the garage door remote 110 uses an Internet connection 199 to the server 130 via the garage door remote's 4G LTE communications channel to transmit an RPC message to the server 130 requesting the server 130 to authorize the garage door remote 110 to command the garage door IoT device 120 to open the garage door. The RPC request contains the identifiers for both the garage door remote 110 and the garage door IoT device 120, along with the request for the garage door remote 110 to be authorized to perform the command "open" on the garage door through the garage door IoT device.

The authorization device 130 receives the second request from the requesting device 110, determines that the requesting device 110 (and, optionally, of a user thereof) is authorized to command the identified IoT device 120 to perform the action. For a requesting device 110 determined to be authorized to command the identified IoT device 130 to perform the requested action, the authorization device 130 transmits an encrypted authorization for the requesting device 110 to command the IoT device 120 to perform the action to the requesting device 110 over the communication network 199 including at least one TCP/IP communication link—Block 330. Note that in embodiments as described in connection with FIG. 3, the authorization device 130 transmits encrypted information that cannot be read by the requesting device 120, but can be read by the IoT device 110. This feature contributes to reducing the risk that an unauthorized third party may intercept an authorization. In some embodiments, to further reduce such risk, the encrypted authorization can expire upon a predetermined event, such as closing the garage door, or after a period of time.

In the further example, server 130 receives the RPC requesting the server 130 to authorize the garage door remote 110 to command the garage door IoT device 120 to open the garage door. The server 130 determines that the garage door remote 110 is authorized to command the garage door IoT device 120 to open the garage door by checking one or more ACLs related to the garage door remote 110 and the garage door IoT device 120. The server 130 then transmits an encrypted authorization (which, in this example, cannot be read by the garage door remote 110) over the Internet 199 to the remote 110 for commanding the garage door IoT device 120 to open the garage door.

The requesting device 110 receives the encrypted authorization via the communication network 199 including at least one TCP/IP communication link, and relays the encrypted authorization to the IoT device 120 via the non-TCP/IP communication link 140 between the requesting device 110 and the IoT device 120—Block 340. In the continuing example, the garage door remote 110 receives the encrypted authorization over the Internet 199 for commanding the garage door IoT device 120 to open the garage door. The garage door remote 110 relays the encrypted authorization to the garage door IoT device 120 via the Bluetooth communications link 140 between the garage door remote 110 and the garage door IoT device 120.

The IoT device 120 receives the encrypted authorization from the requesting device 110 via the non-TCP/IP communication link 140 between the requesting device 110 and the IoT device 120, decrypts the received authorization, and performs the action specified in the authorization—Block 350. In the continuing example, the garage door IoT device 120 receives the encrypted command to open from the garage door remote 110 via the Bluetooth link 140, decrypts the command, and opens the garage door.

Other Example Embodiments

FIG. 4 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain example embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures. For example, while some embodiments disclosed herein are based on an architecture comprising a Bluetooth personal area network (PAN) between the IoT device and the requesting device, and a TCP/IP local area network (LAN)/wide area network (WAN) between the requesting device and the authorization device, the principles of the technology apply as well to architectures that include any PAN between an IoT device (a device without a direct or reliable LAN/WAN connection to the authorization device) using the PAN to the requesting device to exchange information with the authorization device over a requesting device's LAN/WAN connection. In some embodiments, the link between the IoT device and the requesting device can be TCP/IP. For example, the IoT device might not have a reliable connection to the Internet, but it could establish a Wi-Fi Direct connection directly with the requesting device.

What is claimed is:

1. A computer-implemented method to control communication between Internet of things (IoT) devices and requesting devices, comprising:
    receiving, by a requesting device, a device identifier of an IoT device;
    requesting, by the requesting device via a communication network including at least one Transmission Control Protocol/Internet Protocol (TCP/IP) communication link, authorization, from an authorization device, to communicate with the identified IoT device, the authorization required for the requesting device to communicate with the IoT device;
    determining, by the authorization device in response to receiving the request, an authorization of the requesting device to communicate with the identified IoT device, wherein the determining comprises comparing an identifier of the requesting device to an access control list associated with the IoT device identifier;
    for a requesting device determined by the authorization device to be authorized to communicate with the identified IoT device, transmitting, to the requesting device over the communication network, an encrypted authorization authorizing the requesting device to communicate with the IoT device;
    receiving, by the requesting device, the transmitted encrypted authorization via the communication network;
    relaying, by the requesting device to the IoT device via a communication link between the IoT device and the requesting device, the received transmitted encrypted authorization;
    receiving, by the IoT device, the encrypted authorization from the requesting device via the IoT/requesting device communication link;
    decrypting, by the IoT device, the received authorization;
    determining, by the IoT device, that the decrypted authorization is valid; and
    communicating, by the IoT device, with the requesting device over the IoT/requesting device communication link in response to a valid decrypted authorization.

2. The method of claim 1, wherein the IoT device and the authorization device are not in communication over a direct TCP/IP communications link.

3. The method of claim 1, wherein the IoT device comprises a beacon, and receiving the IoT device identifier comprises receiving a beacon broadcast comprising the IoT identifier.

4. The method of claim 3, wherein the beacon is a Bluetooth personal area network (PAN) beacon.

5. The method of claim 4, wherein the broadcast is a JavaScript Object Notation (JSON)-formatted request over the Bluetooth PAN.

6. The method of claim 1, wherein the request is a Remote Procedure Call (RPC) over the communication network including at least one TCP/IP communication link.

7. The method of claim 1, wherein the authorization expires upon one of a pre-determined condition and a predetermined period of time.

8. A computer program product, comprising:
a non-transitory computer-readable storage device having computer-executable program instructions embodied thereon that when executed by a computer cause the computer to control communication between Internet of things (IoT) devices and requesting devices, the computer-executable program instructions comprising:
computer-executable program instructions to receive, by a requesting device, a device identifier of the IoT device;
computer-executable program instructions to request, by the requesting device from an authorization device over a communication network including at least one TCP/IP communication link, authorization to communicate with the identified IoT device, the authorization required for the requesting device to communicate with the IoT device;
computer-executable program instructions to determine, by the authorization device in response to receiving the request, an authorization of the requesting device to communicate with the identified IoT device, wherein the determining comprises comparing the identifier of the requesting device to an access control list associated with the IoT device identifier;
computer-executable program instructions to transmit, by the authorization device to the requesting device over the communication network including at least one TCP/IP communication link, for a requesting device determined authorized to communicate with the identified IoT device, an encrypted authorization for the requesting device to communicate with the IoT device;
computer-executable program instructions to receive, by the requesting device, the transmitted encrypted authorization to the IoT device via a non-TCP/IP communication link between the requesting device and the IoT device;
computer-executable program instructions to relay, by the requesting device to the IoT device via the non-TCP/IP communication link, the received transmitted encrypted authorization;
computer-executable program instructions to receive, by the IoT device, the encrypted authorization from the requesting device via the non-TCP/IP communication link between the requesting device and the IoT device;
computer-executable program instructions to decrypt, by the IoT device, the received authorization;
computer-executable program instructions to determine, by the IoT device, that the decrypted authorization is valid; and
computer-executable program instructions to communicate, by the IoT device, with the requesting device over the IoT/requesting device communication link in response to a valid decrypted authorization.

9. The computer program product of claim 8, wherein the IoT device and the authorization device are not in communication over a direct TCP/IP communications link.

10. The computer program product of claim 8, wherein the IoT device is a beacon of the non-TCP/IP communication link, and receiving the IoT device identifier comprises receiving a beacon broadcast comprising the IoT identifier.

11. The computer program product of claim 10, wherein the non-TCP/IP communication link is a Bluetooth personal area network (PAN).

12. The computer program product of claim 11, wherein the broadcast is a JavaScript Object Notation (JSON)-formatted request over the non-TCP/IP communication link.

13. The computer program product of claim 8, wherein the request is a Remote Procedure Call (RPC) over the communication network including at least one TCP/IP communication link.

14. The method of claim 8, wherein the authorization expires upon one of a pre-determined condition and a predetermined period of time.

15. A system to control communication between Internet of things (IoT) devices and requesting devices, comprising:
a storage device; and
a processor communicatively coupled to the storage device, wherein the processor executes application code instructions that are stored in the storage device and to cause the system to:
receive, by a requesting device, an identifier of an IoT device;
request, by the requesting device from an authorization device over a communication network including at least one TCP/IP communication link, authorization to communicate with the identified IoT device, the authorization required for the requesting device to communicate with the IoT device;
determine, by the authorization device in response to receiving the request, an authorization of the requesting device to communicate the identified IoT device, wherein the determining comprises comparing the identifier of the requesting device to an access control list associated with the IoT device identifier;
transmit, by the authorization device to the requesting device over the communication network including at least one TCP/IP communication link, for a requesting device determined authorized to communicate with the identified IoT device, an encrypted authorization for the requesting device to communicate with the IoT device;
receive, by the requesting device, the transmitted encrypted authorization;
relay, by the requesting device to the IoT device via an IoT device/requesting device communication link, the received transmitted encrypted authorization;
receive, by the IoT device, the encrypted authorization from the requesting device via the PAN between the requesting device and the IoT device;
decrypt, by the IoT device, the received authorization;
determine, by the IoT device, that the decrypted authorization is valid; and
communicate, by the IoT device, with the requesting device in response to a valid authorization.

16. The system of claim 15, wherein the IoT device and the authorization device are not in communication over a direct TCP/IP communications link.

17. The system of claim 15, wherein the IoT device is a beacon of the non-TCP/IP communication link, and receiving the IoT device identifier comprises receiving a beacon broadcast comprising the IoT identifier.

18. The system of claim 15, wherein the beacon is a Bluetooth personal area network (PAN).

19. The system of claim 18, wherein the first request is a JavaScript Object Notation (JSON)-formatted request over the TCP/IP communication link.

20. The system of claim 15, wherein the second request is a Remote Procedure Call (RPC) over the communication network including at least one TCP/IP communication link.

* * * * *